Aug. 31, 1926.
L. N. VINCENT
FLANGE OILER OR LUBRICATOR
Filed May 7, 1923
1,598,180
2 Sheets-Sheet 1
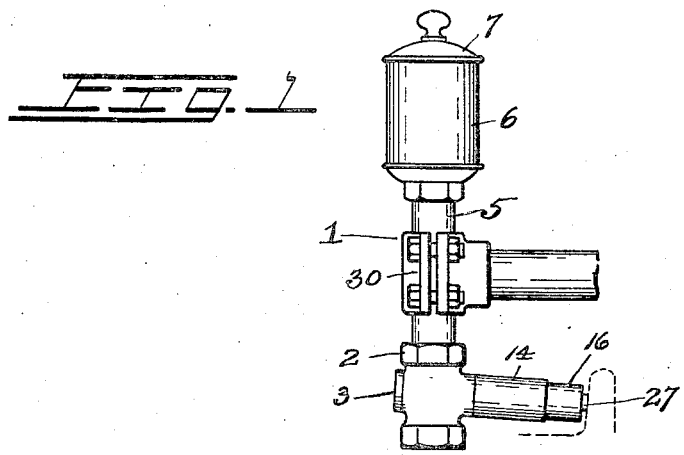
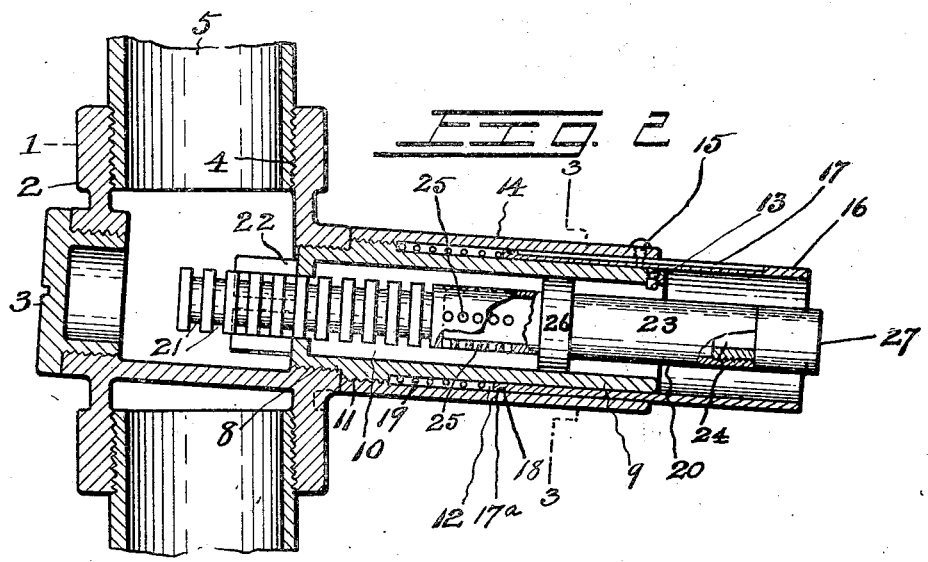
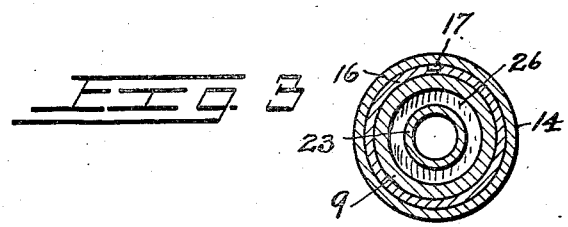
INVENTOR
Louis N. Vincent
Blackwood Bro.
ATTORNEYS.

Aug. 31, 1926.
L. N. VINCENT
FLANGE OILER OR LUBRICATOR
Filed May 7, 1923
1,598,180
2 Sheets—Sheet 2
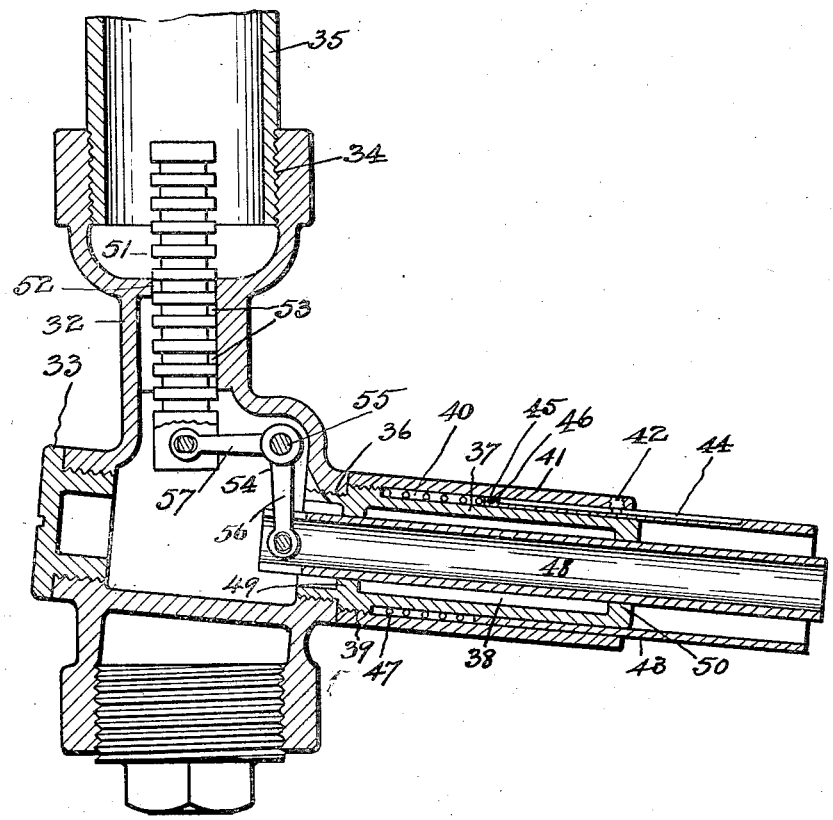
INVENTOR
Louis N. Vincent
Blackwood Bros,
ATTORNEYS.

Patented Aug. 31, 1926.

1,598,180

UNITED STATES PATENT OFFICE.

LOUIS N. VINCENT, OF SEATTLE, WASHINGTON; JESSIE R. VINCENT, EXECUTRIX OF SAID LOUIS N. VINCENT, DECEASED, ASSIGNOR TO IMPERIAL STEAM APPLIANCE COMPANY, OF SEATTLE, WASHINGTON, A CORPORATION.

FLANGE OILER OR LUBRICATOR.

Application filed May 7, 1923. Serial No. 637,402.

My invention relates to improvements in flange oilers or lubricators adapted to automatically oil the flanges of the wheels of locomotives, steam, electric and other cars etc., and more particularly to a flange oiler having a reciprocatory oil feed.

The invention consists in the several features, and in the construction, combination and arrangement of such features as more fully hereinafter described and claimed.

The flanges of the wheels of locomotives, cars etc., have to be oiled or lubricated continuously and when this is accomplished by the manual means now employed the flanges are not kept constantly oiled and as a result they wear through and deteriorate in a very short time to such an extent that the wheel is rendered useless and has to be replaced by a new one.

One object of the invention is to provide means for thoroughly, continuously, and automatically lubricating the flanges of the wheels of a locomotive, car etc., especially when the wheels are travelling on a curved portion of the track, as very little if any lubrication of the flanges is necessary when the wheels are travelling on a straight track, and which will require no attention or care except the keeping of the lubricant receptacle always supplied with the requisite amount of lubricant.

A further object is to provide a flange lubricator for the flanges of wheels which will cause the lubricant to be automatically fed to the flanges of the wheels by means of the lateral or sidewise movement or play of the truck or engine frame and also the lateral movement of the wheels between the rails during their travel on the tracks.

A further object is to provide a flange lubricator which will effectually prevent the oil or lubricant from leaking out of the receptacle and running down the wheels onto the rails, particularly when the weather is hot, while the locomotive or car is standing or not in motion.

A further object is to facilitate the free flow of the oil or lubricant when it becomes sluggish or thick, especially in cold weather, and to feed just the required amount of oil which is necessary for the purpose thereby eliminating waste and effecting a great saving in the amount of oil used.

A further object is to provide a flange oiler or lubricator in which either light or heavy oil may be used, equally as well, irrespective of climatic conditions.

A further object is to provide a flange oiler or lubricator which when placed in the proper operating position with relation to the flange of the wheel needs no further adjustment as the plunger automatically adjusts itself to the movement of the flange of the wheel and keeps in continual intimate contact therewith, and if the nozzle or tip of the plunger wears away the plunger will move forward and take up just the space or distance caused by such wear, and still retain its bearing against the flange.

A further object is to provide a flange lubricator which will automatically remove any dirt or dust which may accumulate inside the tip or nozzle of the plunger by means of the force of the oil or lubricant passing therethrough, or by pressing backward the spring controlled sleeve and removing the dirt or dust by manual means.

A further object is to provide a flange oiler or lubricator which will cause the oil or lubricant to be automatically supplied to the plunger in similar quantities as it is being delivered by the plunger to the flange of the wheel, thereby keeping the plunger constantly full of oil or lubricant.

A still further object is to provide a flange oiler or lubricator which is operated by means of gravity supplemented by the constant and steady pressure of the oil or lubricant therein, and the lateral or sidewise movement or play of the truck or engine frame and the lateral movement of the wheels.

A still further object is to provide a flange oiler or lubricator which is simple, inexpensive and durable in construction very compact and therefore occupies a minimum amount of space, has a minimum number of parts, requires no adjustment of parts after being once placed in position, is not liable to get out of order and which is easy and effective in operation.

A final object is to provide a flange lubricator which is capable of being supplied to any locomotive or car without making any changes therein.

Referring to the drawings:—

Fig. 1 is a front elevation.

Fig. 2 is a central vertical section, partly in elevation.

Fig. 3 is a cross-section taken on the line 3—3 of Figure 2.

Fig. 4 is a central vertical section showing a modified form of the invention.

In the drawings in which similar reference characters denote similar parts throughout the several views, 1 represents the flange oiler or lubricator for wheels, 2 a casing provided with a screw-cap 3 in order to allow access to the interior of the casing for cleaning or other purposes. The upper interior portion of the casing 2 is provided with a screwthreaded opening 4 and into this opening is screwed a vertical pipe 5 provided at its top with a grease cup 6, of any well known character, having a closure 7.

A screwthreaded opening 8 is provided in the inner side of the casing 2 and into this opening is screwed a downwardly extending stationary sleeve 9 having an inner annular chamber 10, screwthreads 11, an annular recess 12, and a stop screw 13.

A stationary outer sleeve 14 is screwed into the screwthreads 11 of the sleeve 9 and encloses and surrounds such sleeve and is provided with a stop screw 15.

A slidable sleeve 16 is provided which is mounted and slides in the annular recess 12 of the stationary sleeve 9 and is provided with a slot 17 in its upper portion, into which the stop screw 15 extends, a flange 17ᵃ on its inner end having a slidable packing ring 18, and a spiral spring 19 is mounted in the recess of the sleeve 9 between the inner end of the recess 12 and the flange 17ᵃ of the sleeve 16 which serves to keep the slidable sleeve 16 normally in its outward position extending beyond the sleeve 9, the stop screw 15 limiting the outward movement of such sleeve.

The oil or lubricant is fed or applied to the flanges of the wheels by means of a reciprocable plunger 20 which is mounted in the chamber 10 of the sleeve 9, its inner end being provided with a plurality of annular recesses or pockets 21, and mounted in a slotted bearing 22 projecting from the inner end of the sleeve 9.

The outer portion 23 of the plunger is made hollow, as at 24, and is provided with a series of holes 25 therethrough, preferably four series, an annular projection, flange or ring 26 engages and slides within the inner wall of the chamber 10, and acts and serves as a piston head to force the oil or lubricant from the chamber 10 through the series of holes 25 through the plunger to the flange of the wheel.

The outer or delivery end 27 of the plunger is provided with a nozzle or tip screwed therein which may be made of metal, rubber or any other wear resisting material and which bears constantly on the flange of the wheel and is moved outwardly by the pressure of the oil and gravity and inwardly by the sidewise movement of the engine or car frame, and the sidewise play or movement of the wheels as they travel on the track thereby causing the reciprocation of the plunger.

The plunger is kept from sliding out of the stationary sleeve 9 by means of the stop screw 13.

The nozzle or tip being detachable it may be removed when worn out and a new one substituted therefor.

The flange lubricator may be mounted on the locomotive or car frame by means of a bracket 9 secured to the vertical pipe 5 by means of a clamp 30 or by means of a vertical pipe or tube 31 suitably mounted on the locomotive or car frame.

In use the oil or lubricant is introduced in to the grease cup until the grease cup, pipe 5 and the chamber in the casing 2 are filled to their capacity, when the pressure of the oil or lubricant in the chamber 10, the gravitating action of the plunger and the play or lateral movement of the wheels of the locomotive or car, during their travel on the track, causes the plunger to be reciprocated in unison therewith.

The oil or lubricant enters or fills one or more of the annular recesses or pockets 21, the number being dependent on the distance the inner end of the plunger extends beyond the slotted bearing 22, and when the plunger moves outward towards the flange of the wheel it causes the recesses or pockets, filled with the oil or lubricant, to be moved within the chamber 10, the inward movement of the plunger causes the annular projection or flange 26 of the same to compress the oil or lubricant in the chamber 10 and forces it through the series of holes 25 into and through the interior of the plunger and out through the tip to the flange of the wheel.

In the modified form of the invention shown in Figure 4 of the drawings, 32 represents the casing of the flange oiler or lubricator provided with a screw-cap 33 in order to allow access to the interior of the casing. The upper interior portion of the casing 32 is provided with a screwthreaded opening 34 and into this opening is screwed a vertical pipe 35 adapted to be provided at its top with a suitable grease cup, not shown.

A screwthreaded opening 36 is provided in the inner side of the casing 32 and into the opening is screwed a downwardly extending stationary sleeve 37 having an inner annular chamber 38, screwthreads 39 and an annular recess 40. A stationary sleeve 41 is screwed into the screwthreads 39 of the sleeve 37 and encloses and surrounds such sleeve and is provided with a stop screw 42. A slidable sleeve 43 is provided which is mounted and slides in the annular recess 40 of the stationary sleeve 37 and is provided with a slot 44 in its upper portion into which the stop screw 42 extends. A flange 45 on its inner end having a packing ring 46, and a spiral spring 47 is mounted in the recess 40 of the slidable sleeve 43 between the inner end of the recess 40 and the flange 45 of the sleeve 43 which serves to keep the slidable sleeve 43 normally in its outward position extending beyond the sleeve 41 the stop screw 42 limiting its outward movement. The oil or lubricant is fed or applied to the flanges of the wheels by means of a reciprocable hollow plunger 48, mounted in bearings 49 and 50 of the sleeve 37.

A vertical reciprocable oil feeder 51 is mounted in a bearing 52 in the casing 32 and is provided with a plurality of annular recesses or pockets 53.

The plunger 48 and the oil feeder 51 are operatively connected by means of a bell-crank lever 54 mounted on a pivot 55 in the casing 32, one of its arms 56 being pivoted to the plunger 48 and the other arm 57 pivoted to the oil feeder 51. In use, the modified form above described, the oil or lubricant is introduced into the usual grease cup, not shown, passes through the pipe 35 into the annular recesses or pockets 53, of the oil feeder 51 and as the plunger moves outward by gravity towards the flange of the wheel, it causes the recesses or pockets 53 filled with the oil or lubricant to be moved within the chamber 58 of the casing 32 and causes them to feed or deliver the oil to such chamber and as the plunger is moved inward, by the movement of the flange of the wheel, the feeder is moved upwardly and oil from the chamber 58 is forced into and through the plunger aided by gravity onto the flange of the wheel.

I do not wish to be understood as limiting myself to the specific details of construction and arrangement as herein described and illustrated, as it is manifest that variations and modifications may be made in the several features of construction and arrangement in the adaption of the device to the various conditions of use, without departing from the spirit and scope of my invention and the terms of the following claims.

What I claim is:—

1. A flange lubricator comprising, in combination, a primary lubricant chamber, a secondary lubricant chamber connected to said primary lubricant chamber, and a plunger mounted for reciprocation in said secondary lubricant chamber, means associated with the plunger to transfer lubricant from one chamber to the other without establishing direct communication therebetween, said plunger having a tubular extension communicating with said secondary lubricant chamber and projecting therefrom normally to contact with a wheel flange and to be actuated thereby to pump lubricant through the tubular extension on the flange.

2. A flange lubricator comprising, in combination, a primary lubricant chamber, a secondary lubricant chamber connected to said primary lubricant chamber, and a plunger mounted for reciprocation in said secondary lubricant chamber, a notched extension on the plunger to transfer lubricant from one chamber to the other without establishing direct communication therebetween, said plunger having a tubular extension communicating with said secondary lubricant chamber and projecting therefrom normally to contact with a wheel flange and to be actuated thereby to pump lubricant through the tubular extension on the flange.

3. A flange lubricator comprising, in combination, a primary lubricant chamber, a secondary lubricant chamber connected to said primary lubricant chamber, and a plunger mounted for reciprocation in said secondary lubricant chamber, a notched extension on the plunger having one end projecting into the primary chamber to transfer lubricant from one chamber to the other without establishing direct communication therebetween, said plunger having a tubular extension communicating with said secondary lubricant chamber and projecting therefrom normally to contact with a wheel flange and to be actuated thereby to pump lubricant through the tubular extension on the flange.

4. A flange lubricator comprising, in combination, a primary lubricant chamber, a secondary lubricant chamber connected to said primary lubricant chamber, a plunger mounted for reciprocation in said secondary lubricant chamber, means associated with the plunger to transfer lubricant from one chamber to the other without establishing direct communication therebetween, said plunger having a tubular extension communicating with said secondary lubricant chamber and projecting therefrom normally to contact with a wheel flange and to be actuated thereby to pump lubricant through the tubular extension on the flange, a tubular sleeve surrounding the outer end of said tubular extension and means normally urging said sleeve against the flange.

In testimony whereby I have affixed my signature.

LOUIS N. VINCENT.